(12) United States Patent
Oberg

(10) Patent No.: US 8,615,946 B2
(45) Date of Patent: *Dec. 31, 2013

(54) INSULATED METAL WALL SYSTEMS AND RELATED METHODS

(76) Inventor: Craig Oberg, Ephraim, UT (US)

( * ) Notice: Subject to any disclaimer, the term of this patent is extended or adjusted under 35 U.S.C. 154(b) by 366 days.

This patent is subject to a terminal disclaimer.

(21) Appl. No.: 12/977,930

(22) Filed: Dec. 23, 2010

(65) Prior Publication Data

US 2012/0159885 A1    Jun. 28, 2012

(51) Int. Cl.
*E04B 7/00* (2006.01)
*E04B 9/00* (2006.01)
*E04B 7/22* (2006.01)
*E04B 1/74* (2006.01)

(52) U.S. Cl.
USPC ....... 52/404.1; 52/406.1; 52/407.1; 52/407.3; 52/404.5; 52/309.4; 52/309.8; 52/309.15

(58) Field of Classification Search
USPC ............. 52/404.1–404.3, 408–410, 478–479, 52/483.1, 287.1, 288.1, 309.4, 309.8, 52/309.15, 309.16, 407.3–407.5
See application file for complete search history.

(56) References Cited

U.S. PATENT DOCUMENTS

| | | | |
|---|---|---|---|
| 3,996,834 A | | 12/1976 | Reynolds |
| 4,058,949 A | * | 11/1977 | Bellem ......................... 52/407.1 |
| 4,346,543 A | * | 8/1982 | Wilson et al. ................. 52/404.2 |
| 4,449,343 A | | 5/1984 | Henningsen |
| 4,651,489 A | * | 3/1987 | Hodges et al. .................. 52/409 |
| 4,735,026 A | | 4/1988 | Forsythe |
| 4,736,561 A | | 4/1988 | Lehr et al. |
| 4,930,285 A | | 6/1990 | Ward |
| 5,095,673 A | | 3/1992 | Ward |
| 5,561,959 A | * | 10/1996 | Alderman et al. ........... 52/407.3 |
| 5,636,487 A | | 6/1997 | Fligg |
| 6,487,800 B1 | | 12/2002 | Evans et al. |
| 6,513,295 B2 | * | 2/2003 | Bernardino ................ 52/506.09 |

(Continued)

FOREIGN PATENT DOCUMENTS

| | | |
|---|---|---|
| EP | 0953693 | 11/1999 |
| JP | 10-131411 | 5/1998 |

(Continued)

OTHER PUBLICATIONS

U.S. Appl. No. 12/899,399, filed Oct. 6, 2010; Craig Oberg; office action issued Mar. 21, 2012.
PCT Application PCT/US2010/051682; filed Oct. 6, 2010; Craig Oberg; International Search Report mailed Jun. 29, 2011.
U.S. Appl. No. 12/995,147, filed Feb. 28, 2011; Craig Oberg.

(Continued)

*Primary Examiner* — Jeanette E. Chapman
(74) *Attorney, Agent, or Firm* — Thorpe North & Western LLP

(57) ABSTRACT

An insulated wall system and related methods of installing walls is set forth. The system includes a plurality of metal purlins (10), a plurality of outer panels (2), a plurality of thermal insulation blocks (4), cleats (14), and fasteners (12). The metal purlins (10) can form a parallel array of purlins. The outer panels (2) can be attached to the metal purlins (10) in the parallel array. The thermal insulation blocks (4) can be disposed between the metal purlin (10) and the outer panel (2). The cleat (14) can be disposed between the thermal insulation blocks (4) and the outer panel (2) and has a protrusion which is capable of securing the thermal insulation block (4) and inhibits lateral movement between the thermal insulation block (4) and the cleat (14).

18 Claims, 4 Drawing Sheets

(56) References Cited

U.S. PATENT DOCUMENTS

| | | | |
|---|---|---|---|
| 6,666,638 B2 * | 12/2003 | Craven | 411/413 |
| 7,357,353 B2 | 4/2008 | Stephens | |
| 8,316,605 B2 * | 11/2012 | Oberg | 52/404.1 |
| 2003/0167718 A1 * | 9/2003 | Alderman | 52/407.3 |
| 2007/0057870 A1 | 3/2007 | Kamada et al. | |
| 2008/0083183 A1 | 4/2008 | Rymell et al. | |
| 2008/0110123 A1 | 5/2008 | Oberoi et al. | |
| 2011/0078973 A1 | 4/2011 | Oberg | |

FOREIGN PATENT DOCUMENTS

| | | |
|---|---|---|
| JP | 2001-032458 | 2/2001 |
| KR | 20-1987-0001731 | 5/1987 |
| WO | WO2007/057870 | 5/2007 |

OTHER PUBLICATIONS

PCT Application PCT/US2009/045323; filed May 27, 2009; Craig Oberg; ISR mailed Dec. 28, 2011.

* cited by examiner

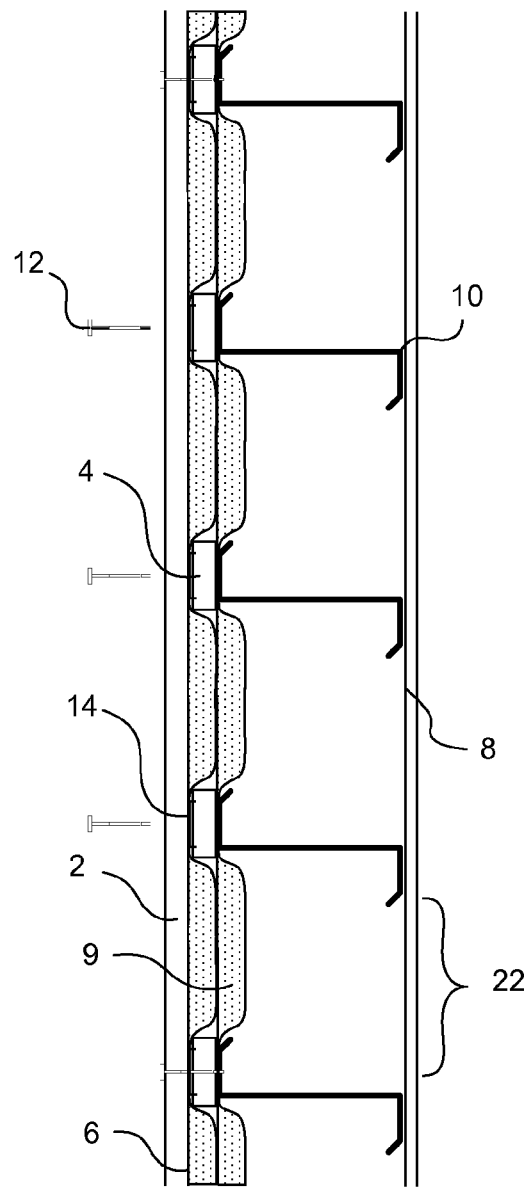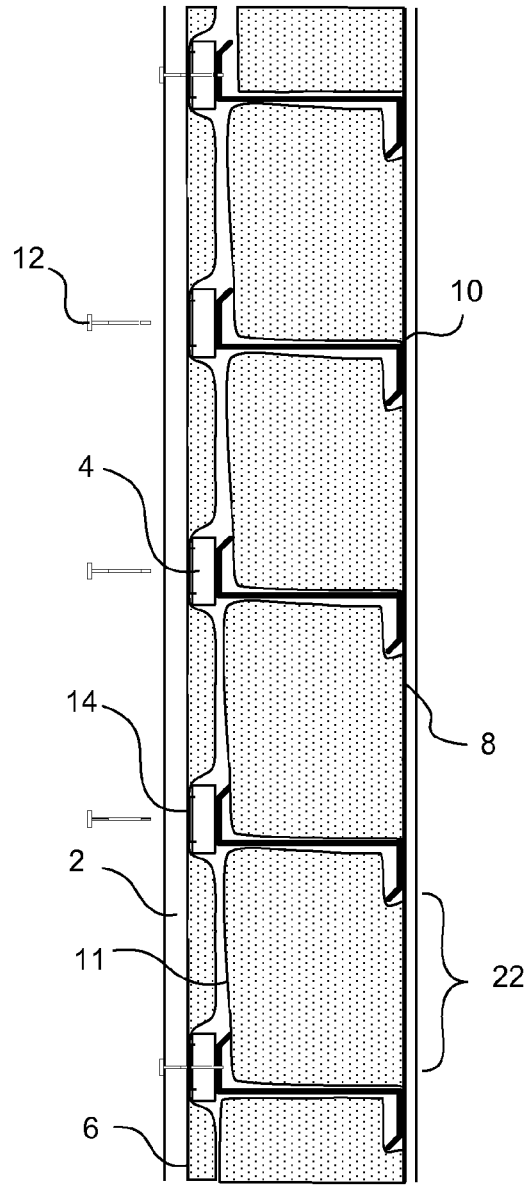
FIG. 1B
FIG. 1C

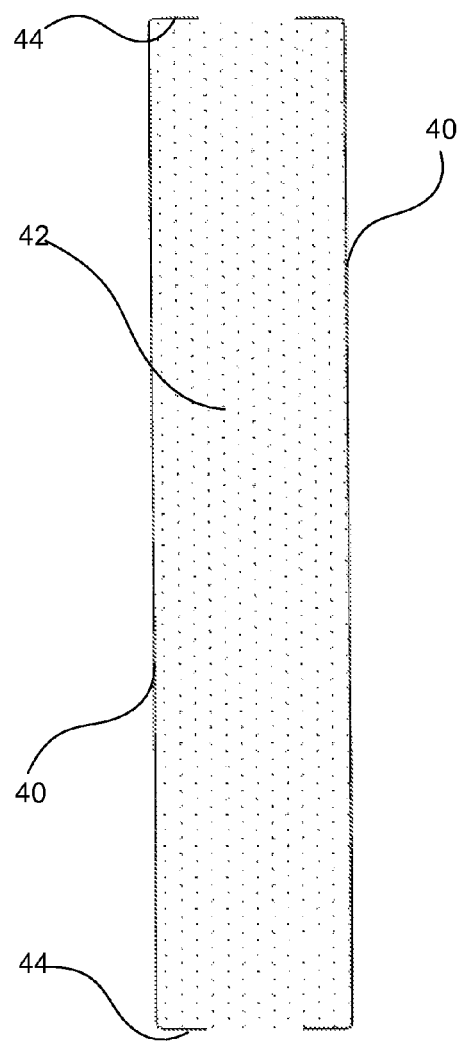
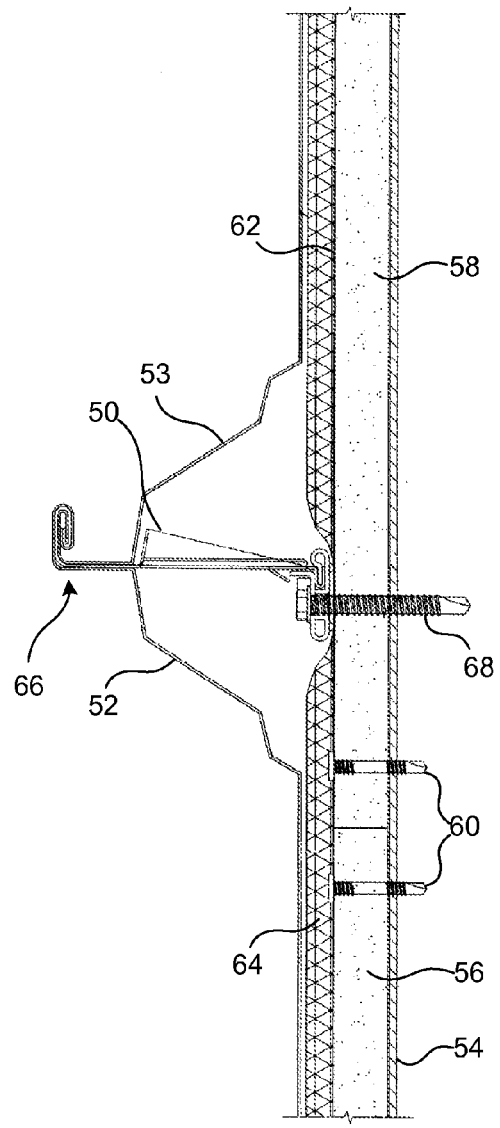
FIG. 4
FIG. 5

INSULATED METAL WALL SYSTEMS AND RELATED METHODS

RELATED APPLICATIONS

This application claims priority to U.S. patent application Ser. No. 12/899,399, filed Oct. 6, 2010, which is incorporated herein by reference.

FIELD OF THE INVENTION

The present invention relates generally to insulated metal wall systems and associated methods.

BACKGROUND

Metal roofs and walls are well known and have been used for many years in commercial and industrial-type buildings. Typically, such roofs and walls are constructed of parallel spaced joists or purlins over which are placed the various other components of the roof or wall, including the outer layer of the roof or wall. As energy efficiency standards have increased, new government requirements have forced manufacturers and installers of these types of systems to increase the amounts, types, and location of insulation used in these systems, including the requirement of placing a thermal insulation block between the metal purlin and the outer layer of the wall or roof. Unfortunately, some new insulation requirements can weaken or lessen the lateral strength of these systems. Accordingly, research continues into structural systems, particularly wall systems, which comply with all government requirements but which do not suffer from reduced lateral strength.

SUMMARY OF THE INVENTION

An insulated wall system which can be used in walls can include a plurality of metal purlins, a plurality of outer panels, a plurality of thermal insulation blocks, cleats, and fasteners. The metal purlins can be configured to form a parallel array of purlins such that voids exist between the metal purlins in the parallel array. The outer panels can be configured to be attached to the metal purlins in the parallel array. The thermal insulation blocks can be configured to be disposed between the metal purlin and the outer panel. The cleats can be configured to be disposed between the thermal insulation blocks and the outer panel and can have a protrusion which is capable of securing the thermal insulation block, thereby inhibiting lateral movement between the thermal insulation block and the cleat. The fastener can be configured to secure the outer panel, the cleat, and the thermal insulation block to the metal purlin.

A method of installing an insulated wall includes the steps of arranging a plurality of metal purlins in a substantially parallel configuration such that voids exist between the metal purlins, disposing a thermal insulation block on the metal purlin and disposing a cleat on the thermal insulation block. An outer panel can be disposed on the cleat, and the outer panel, cleat, and thermal insulation block can be secured to the metal purlin with a threaded fastener. The cleat used in the method can have a protrusion which secures the thermal insulation block and inhibits lateral movement between the thermal insulation block and the cleat.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 1B is a cross-sectional view of an insulated wall having a double insulation layer and a substantially open void space.

FIG. 1C is a cross-sectional view of an insulated wall installed using a full cavity.

FIG. 4 is a cross-sectional side view of one embodiment of a cleat and thermal insulation block.

FIG. 5 is a cross-sectional side view of a standing seam system in accordance with one embodiment.

Figure 1A:
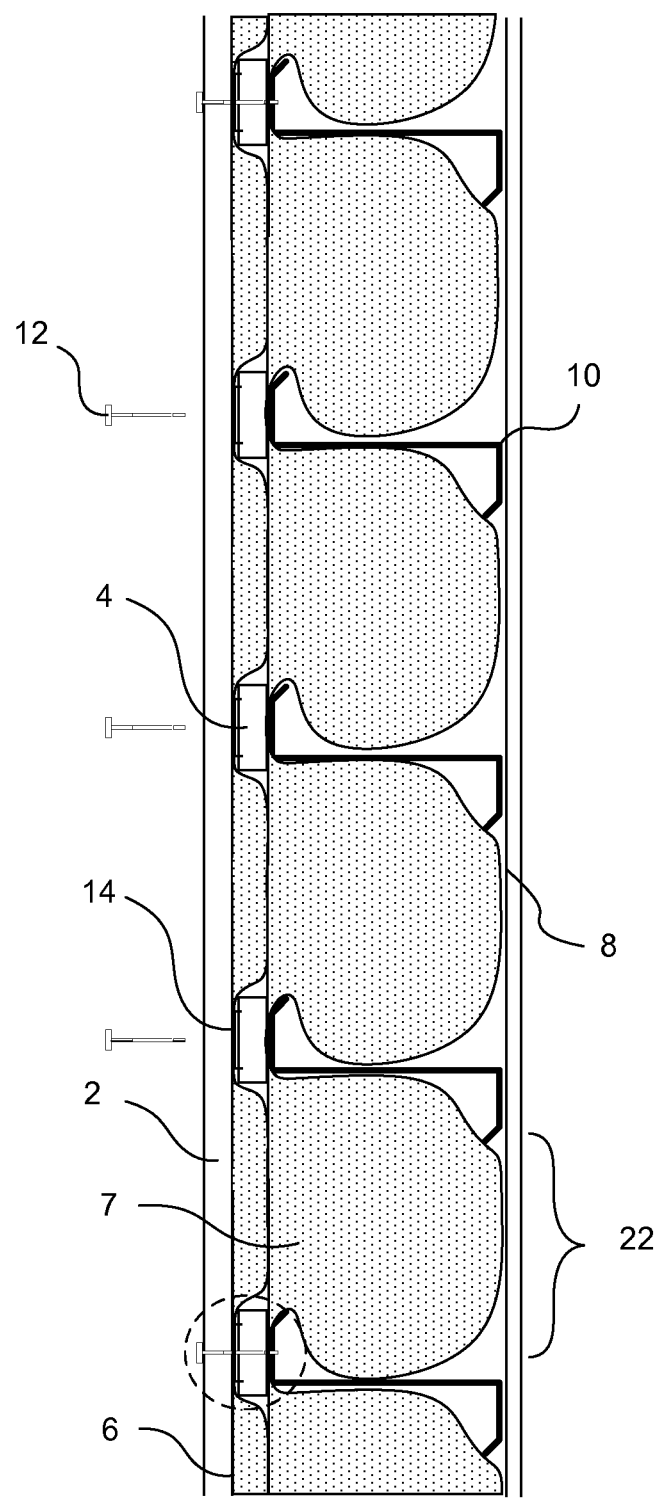
FIG. 1A is a cross-sectional view of an insulated wall installed using a full cavity.

These figures are provided merely for convenience in describing specific embodiments of the invention. Alteration in dimension, materials, and the like, including substitution, elimination, or addition of components can also be made consistent with the following description and associated claims. Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a purlin" includes one or more of such purlins, reference to "a thermal insulation block" includes reference to one or more of such blocks, and reference to a "disposing" step refers to one or more of such steps.

Definitions

In describing and claiming the present invention, the following terminology will be used in accordance with the definitions set forth below.

As used herein, the term "threaded fastener" refers to any fastening device or combination of devices which incorporates an at least partially threaded cylinder or shaft as a component of the device. Non-limiting examples of such devices include screws, bolts, and the like. Typically, self-tapping metal screws are used, although other fasteners can be used (e.g. by pre-drilling holes).

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Any steps recited in any method or process claims may be executed in any order and are not limited to the order presented in the claims unless otherwise stated. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

A system and related method for installing and insulating walls is provided. FIG. 1A shows one embodiment of an insulated wall system which includes metal purlins 10, outer panels 2, thermal insulation blocks 4, cleats 14, threaded fasteners 12, and a first insulation layer 6. The metal purlins 10 are configured to be arranged in a parallel or substantially parallel array such as shown in FIG. 1A. When the purlins are disposed in the parallel array, voids or spaces 22 exist between the purlins. The purlins can be made of any metal or metal alloy having sufficient mechanical strength including but not limited to steel, alloys of steel, aluminum, and others. The purlins can take any form known in the art including, but not limited, to I-beams, Z-shaped (shown in FIG. 1A), C-shaped, tubular, or boxed purlins. As is known in the art, the purlins form the primary structural support for the wall structure. As such the purlins are typically attached the foundation or footings and a roof structure. These purlins can generally be formed of a heavy gauge, although this can be varied depending on the installation requirements. As a general rule, the purlins are from about 16 gauge to about 12 gauge, and typically 14 gauge purlin. Other gauge material may be suitable for some designs.

The outer panels 2 can form the external surface of the walls which are typically the layer exposed to weathering and the elements, although such walls may also be constructed within buildings. As with the purlins 10, the outer panels can be made of any suitable material such as metal or metal alloy or sheet material known in the art, including but not limited to steel, alloys of steel, aluminum, tin, and non-metals such as fiberglass, polycarbonates, plastic, and the like. The outer panels can be interlocking, corrugated, or of any other design or configuration known in the art. The type and thickness of the outer panels can vary depending on the intended use. In one option, the outer panels can be corrugated 26 gauge or 29 gauge metal, although from 30 to 16 gauge can also be useful. When installed, the outer panels 2 can be attached to the metal purlin by threaded fasteners 12.

The thermal insulation blocks can be disposed between the outer panel 2 and the metal purlin 10 so as to reduce or substantially prevent the transfer of heat between the outer panel 2 and the metal purlin 10. The thermal insulation blocks 4 can be made of any insulative material known in the art including, but not limited to polystyrene, polyisocyanurate, polyurethane, mixtures thereof, and the like. The insulation is typically a foamed polymer which can be high density foam and has structural resistance to compaction during compression from the fasteners 12. The thermal insulation blocks 4 can be any size or shape so long as they form an insulative layer between the outer panels 2 and the metal purlins 10. Typically, the insulation block can be an elongated block which substantially coincides with a longitudinal upper surface of the metal purlin. The block can optionally have a width which corresponds to the upper purlin face, although the block can extend slightly beyond the edges of the purlin. For example, in one case the top purlin face can be about 2.5" wide such that the block can be from about 2.5" to about 6" wide. In one aspect, the blocks can be about 5" wide. Although dimensions can vary, the blocks can often be from about ¾" to about 2" thick, with about 1" thickness providing good results under most configurations.

In one embodiment, the wall system can optionally include an adhesive layer disposed between the thermal insulation block 4 and the cleat 14, the thermal insulation block and the metal purlin 10, or both. The adhesive layer facilitates the construction or assembly of the insulated wall. For example, when the adhesive layer is present between the thermal insulation block and the metal purlin, the thermal insulation block is held in place with respect to the metal purlin until the entire wall system can be secured using the threaded fasteners 12. Any suitable adhesive can be used such as, but not limited to, contact adhesive, reactive adhesives (e.g. epoxy, acrylate, etc.), pressure sensitive adhesives, solvent adhesives, hot melt adhesives, and the like.

Figure 2:
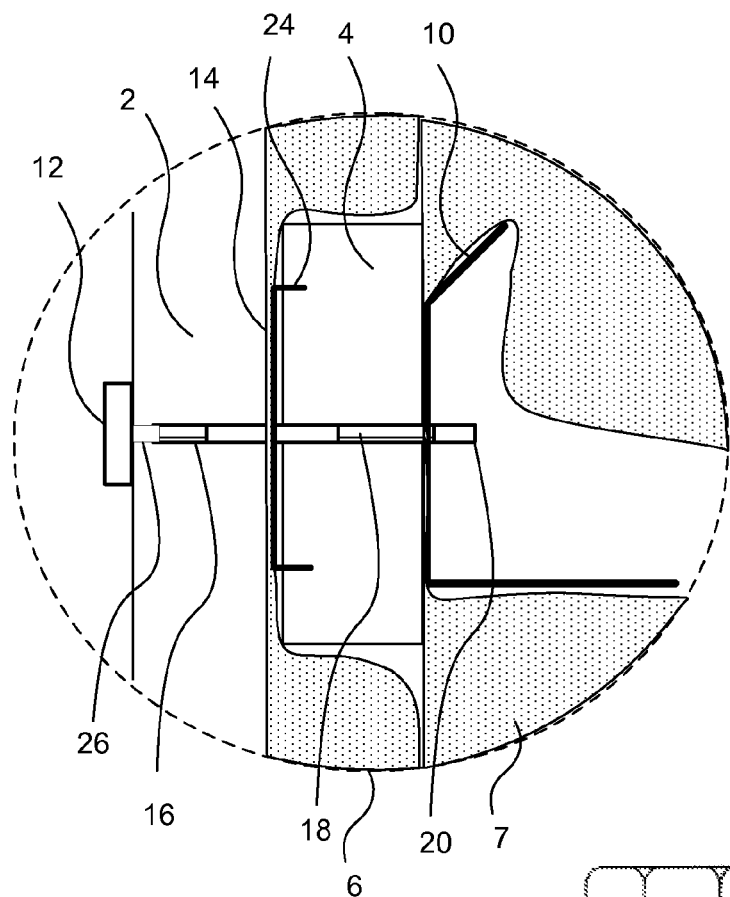
FIG. 2 is a blown-up view of the outlined corresponding region of FIG. 1A.

In order to reduce or prevent lateral movement between the outer panel 2 and the thermal insulation block 4, the wall system can include cleats 14 which are disposed between the thermal insulation block 4 and the outer panel 2. FIG. 2 shows an exploded view of the dashed region in FIG. 1A and illustrates in greater detail on embodiment of the cleat 14 and its relationship to the other components in the wall system. The cleats 14 can have a protrusion 24, or multiple protrusions, which are configured to secure the thermal insulation block 4 when placed in contact therewith. In the embodiment shown in FIG. 2 the protrusion on the cleat secures the thermal insulation block by penetrating the block (penetrating protrusion). These protrusions engage the insulation block sufficient to reduce lateral or offset movement between the outer panel and the metal purlins.

The cleats 14 can come in a variety of shapes and sizes and can be made of any material so long as the material is sufficiently ridged and strong to inhibit lateral movement of the thermal insulation block or between the thermal insulation block and the outer panel when the cleat is installed. In one embodiment, the cleat can be made from a metal. In another embodiment, the cleat can be a U-shaped piece of metal, the protrusions corresponding to the two ends of the "U." In this embodiment, when the U-shaped cleat 14 is inverted, the two ends or protrusions 24 can penetrate the thermal insulation block 4 and inhibit lateral movement of the block, or between the block and the outer panels 2. In one embodiment, the protrusions on the cleat can be serrated to facilitate embedding the edges into the block. In each case, the cleats and blocks extend substantially the length of the purlin to which they are attached. This can be accomplished using a single block-cleat assembly or multiple such assemblies oriented in series to achieve the desired length. Although other thicknesses can be suitable, the cleat can suitably be formed of 30 gauge to about 18 gauge metal. In one aspect, the cleats can be formed of 28 to 24 gauge metal.

FIG. 4 shows an alternative cleat-block assembly which can be used. Specifically, FIG. 4 shows an embodiment in which metal cleats 40 cap opposing sides of a thermal insulation block 42, effectively sandwiching the thermal insulation block. Like the metal cleat of FIG. 2, the metal cleats shown in FIG. 4 include protrusions 44 which secure the thermal insulation block against lateral movement. The protrusions of the embodiment shown in FIG. 4 secure the thermal insulation block by confining the block between the protrusions (confining protrusions). Like the penetrating protrusions, the confining protrusions engage the insulation block sufficient to reduce lateral or offset movement between the outer panel and the metal purlins. It is noteworthy that, although the cap-style cleats may be used in pairs (e.g. FIG. 4), such pairing of the cleats is not required. Although not shown, in one embodiment, the cleat can include both penetrating protrusions and confining protrusions. In another embodiment, the system can include one cleat with penetrating protrusions and one cleat with confining protrusions.

The thermal insulation block and cleat assembly can be manufactured independently and combined together during construction of the wall system. Alternatively, the thermal insulation block and cleat can be manufactured together and included as an integrated component in the wall system. For example, a pair of cleats can be spaced apart and oriented relative to one another as desired in a final assembly. An insulating precursor material can be blow molded or otherwise injected into the space between the cleats. Optional adhesive layers can be formed to secure the insulation against the cleats, depending on the inherent cohesiveness between the materials. During molding a plastic film can be oriented across an outer side space between opposing protrusions to prevent insulation flowing outside of the assembly. Alternatively, excess insulation can be sliced from the sides, e.g. using a heated wire, blade or saw. Generally, any manufacturing process known in the art can be used so long as the resultant thermal insulation block and cleat integrated component can perform the desired function of insulating the purlins against thermal transfer.

When installed, the wall systems can optionally include insulation layers between the outer panels and the cleats. Such insulation can be standard 2-4 inch insulation, although other thicknesses can be used such that 1" to about 8" insulation can be used. In one aspect, the insulation layer can be 6" insulation. It is noted that these thicknesses are uncompressed thicknesses consistent with conventional usage. During assembly, insulation areas between the outer panels and cleats will be pinched and compressed to ⅜ inch or less.

Referring to FIG. 1A, the voids 22 between the metal purlins 10 can be substantially filled with insulation. The insulation can be any type of insulation known in the art such as fiberglass. Advantageously, the insulation can be provided in two layers. A first insulation layer 6 can be disposed between the plurality of outer panels 2 and the plurality of thermal insulation blocks 4. A second insulation layer 7 can be disposed between the plurality of thermal insulation blocks and the plurality of metal purlins. The second insulation layer can have an expanded portion which at least partially fills the voids as illustrated in FIG. 1A. Alternatively, a second insulation layer 9 can leave the void 22 substantially open as illustrated in FIG. 1B. This can be accomplished by using a uniform thickness insulation layer without expanded segments. Additionally, the second insulation layer can be oriented between the first insulation layer and the insulation block (i.e. both insulation layers on the upper side of the blocks). In yet another alternative shown in FIG. 1C, the second insulation layer 11 can be oriented below the metal purlins. In this case a facing material of the second insulation layer 11 can have a plurality of insulation strips such that insulation is not present between the facing and bottom surface of the purlins. The combination of the first and second insulation layer can dramatically increase the insulation level of the system. It is noteworthy that the first and second insulation layers can be used together and independently.

Each of the insulation layers can be formed of compressible insulation. Although other sizes can be used, 2 inch to 4 inch insulation layers is most common. In one aspect, the combined uncompressed width of the first and second insulation layers can be about 6 inches. In these 6 inch cases, R-values from about 22 to about 26 can be achieved, with up to about R-43 achievable with the void substantially filled. Furthermore, providing insulation layers both above and below the thermal insulation blocks has the unexpected effect of increasing shear load and stiffness of the system. Most often each of the first and second insulation layers are formed of multiple parallel insulation strips which are oriented together. As such, seams between adjacent strips can be present. In one aspect, each of the first and second insulation layers can be offset to prevent seams of adjacent portions of these layers from aligning. For example, a 3 foot wide strip can be followed by regular 6 foots strips in one of the layers. This results in a 3 foot offset of seams in the first insulation layer from seams in the second insulation layer.

As shown generally in FIG. 1A, the second insulation layer 7 can optionally be supported by support rails 8. The support rails can be configured to span the voids between the metal purlins 10 and can be secured to the metal purlins. The support rails can also add to the structural support of the wall system and typically run substantially perpendicular to the purlins. Optionally, the support rails can be formed as a bracing strut system which additionally provides resistance to rotational collapse of the purlins. Such brace supports can be formed of a span member and cantilevered vertical plates. Although explained in more detail in co-pending U.S. Provisional Application No. 61/304,336, the cantilevered vertical plates are rigidly attached to the span members so as to provide support to the purlins.

The components of the insulated wall systems can be secured together using fasteners 12. Specifically, the fasteners used in the system are configured to secure the outer panel 2, the cleat 4, and the thermal insulation block 4 to the metal purlin 10. Generally, any type of fastener such as a threaded fastener or threaded fastener system can be used. Non-limiting examples include screws and bolts, although other mechanisms such as rivets, clips, or the like can be suitable. Most often these fasteners can include a gasket between the outer panel and a contacting surface of the fastener head which helps to form a seal to prevent moisture from entering the structure.

Because the thermal insulation block 4 can be relatively soft, over-tightening of the threaded fasteners can cause the thermal insulation block to become completely or partially crushed, thereby reducing the insulative value provided by the thermal insulation block. Similarly, insulation which is placed between the outer panels 2 and the cleats 14 can be pulled up through the outer panel if over-tightened. In order to prevent over-tightening of the threaded fastener 12, in one embodiment, the threaded fastener 12 can have a first threaded region 20 and a second threaded region 16 which are separated by an unthreaded region 18. (See FIG. 2) The length of the unthreaded region 18 of the threaded fastener 12 can correspond to the thickness of the thermal insulation block. The position of the fastener 12 is shown partially engaged. The system can be assembled such that the threaded fastener is disposed such that the unthreaded region is substantially located within the thermal insulation block. The threaded fastener can optionally include a second unthreaded region 26 proximate the fastener head. This second unthreaded region can correspond to a minimum desired thickness of the outer panel and pinched insulation combined, including optional washers and/or gaskets. In this way, splaying of the outer panel metal immediately around the fastener shaft can be reduced or eliminated while also avoiding pulling insulation up through the outer panel.

Figure 3:
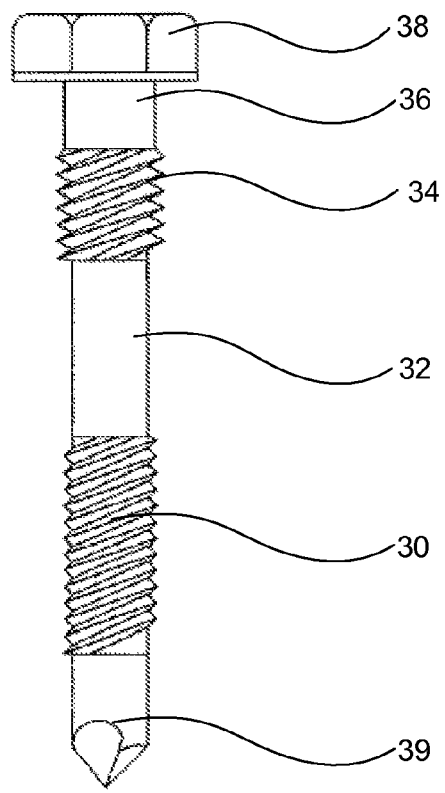
FIG. 3 is a side schematic of a threaded fastener in accordance with one embodiment.

FIG. 3 shows another embodiment of the above described threaded fastener. The fastener includes a first threaded region 30, a first unthreaded region 32, a second threaded region 34, and a second unthreaded region 36 along a common shank, each region having similar characteristics to the corresponding regions of the fastener shown in FIGS. 1 and 2. The fastener shown in FIG. 3 also includes a hexagonal head 38 at a proximal end which facilitates quick and easy installation. The fastener also includes a self-tapping tip 39 to allow for drilling through metal members (e.g. metal outer) panels, cleats, purlins, etc.). Furthermore, the upper second threaded region can be narrower than the lower first threaded region such that once engaged in the wall system, the second threaded region is below the outer panel and upper cleat. In this way, the second threaded region and the first unthreaded region are embedded in the thermal insulation block. Similarly, upon engagement, the first threaded region is through the purlin opposite the insulation block. The threaded fastener generally can include a shank with a head at a proximal end and a tip at a distal end. The shank can have a first threaded region proximate the head and a second threaded region proximate the tip, and which are separated by a primary unthreaded region.

The primary unthreaded region of the threaded fastener can have a length which corresponds to the thickness of a thermal insulation block. The shank can further include a secondary unthreaded region between the head and the first threaded region. In one alternative, the secondary unthreaded region has a shorter length than the primary unthreaded region. In yet another alternative, the first threaded region has a width larger than a width of the second threaded region.

Although the specific geometries can vary, in one aspect, the first unthreaded region can have a length of about 7/16" to about 5/8" and in one aspect about 9/16". These dimensions can vary depending on the stem length (e.g. 2" versus 1.5") and the corresponding wall system dimensions. In a further aspect, as shown in FIG. 3, each of the upper and lower threaded regions can have a different width. For example, the upper second threaded region 34 (including optionally the stem) can have a width which is subtly larger than a width of the lower first threaded region 30. Generally, the difference can be from about 1/64" to about 1/32"; however, the width difference can generally be merely sufficient to ensure that the second threaded region is securely engaged with the wall material. In particular, as the first threaded portion cuts through the wall segment some give (or play) may be left between the threads and the cut hole. By providing slightly wider threads in the second region, any such play can be substantially reduced or eliminated.

In another alternative, the wall system can be a standing seam wall as illustrated, in part, in FIG. 5. In this configuration, a panel clip 50 is used to distance the outer panels 52 and 53 from the purlins 54 (only the top surface is shown). Thermal insulation blocks 56 and 58 can be oriented on top of the purlin 54 in a similar manner as previously described. These thermal blocks can be secured to the purlins as previously described or by using block fasteners 60 which extend through cleat 62, insulation block 56 and top flange of the purlin 54. A first insulation layer 64 can be disposed on the cleat 62.

In a standing seam wall system, the outer panels are crimped together along with the panel clip. As shown in FIG. 5, the panel clip 50 extends up into a crimped portion 66 between adjacent panels 52 and 53. The panel clips 50 are typically spaced apart along the crimped seam and extend substantially the length of the seam. Each panel clip 50 can be secured in place to the purlin 54 via a clip fastener 68. The clip fastener can often be a self-tapping metal screw although other fasteners can suitably be used (e.g. bolts, screws, rivets, pins, etc). The use of panel clips in the standing seam wall system allow the outer panels 52 and 53 to "hang" beside the purlin 54 and supporting structure. This can allow for expansion and contraction of the wall panels and underlying layers without compromise of structural integrity. The second insulation layer can be placed as discussed previously with respect to the corrugated or sheet system.

All embodiments of the systems described herein can be used in accordance with the related method. In one embodiment, a method of installing an insulated wall is provided which includes the steps of arranging a plurality of metal purlins in a substantially parallel configuration such that voids exist between the metal purlins, disposing a thermal insulation block on top of the metal purlin, disposing a cleat on top of the thermal insulation block, disposing a outer panel on top of the cleat, and securing the outer panel, cleat, and thermal insulation block to the metal purlin with a threaded fastener. The cleat used in the method has a protrusion which secures the thermal insulation block and inhibits lateral movement between the thermal insulation block and the cleat. Optional support rails 8 can be mounted substantially perpendicular the purlins 10 spanning the spaces 22. The steps can be performed in the order set forth above, although assembly can occur in various sequences. Furthermore, optional insulation layers can be oriented and laid between the outer panels and the optional support rails. For example, a first insulation layer can be disposed on top of the thermal insulation blocks. A second insulation layer can also be disposed below the first insulation layer either above or below the thermal insulation blocks. In yet another alternative, a second insulation layer can be oriented below the metal purlins. In this case, the second insulation layer can include a facing material which includes gaps along each purlin. Thus, the facing material can contact a bottom surface of the purlin and support strips of the second insulation layer which are present in the voids between purlins.

Although conventionally called girts in the industry, it is understood that when referring to purlins, girts are also included.

It is to be understood that the above-referenced embodiments are illustrative of the application for the principles of the present invention. Numerous modifications and alternative arrangements can be devised without departing from the spirit and scope of the present invention while the present invention has been shown in the drawings and described above in connection with the exemplary embodiment(s) of the invention. It will be apparent to those of ordinary skill in the art that numerous modifications can be made without departing from the principles and concepts of the invention as set forth in the claims.

What is claimed is:

1. An insulated wall system, comprising:
   a plurality of metal purlins, each metal purlin being configured to form a parallel array of purlins such that voids exist between the metal purlins in the parallel array;
   a plurality of outer panels, each panel being configured to be attached to the metal purlins to form an outer deck;
   a plurality of thermal insulation blocks, each thermal insulation block being disposed between the metal purlin and the outer panel;
   a first cleat configured to cap a side of the thermal insulation block and disposed between the thermal insulation block and the outer panel, and a second cleat oriented opposite the first cleat to sandwich the thermal insulation block, wherein each cleat includes a protrusion which secures the thermal insulation block and inhibits lateral movement between the thermal insulation block and the cleat;

a fastener, wherein the fastener is configured to secure the outer panel, the first cleat, the second cleat, and the thermal insulation block to the metal purlin.

2. A system as in claim 1, wherein the voids between the metal purlins are filled with insulation.

3. A system as in claim 2, wherein the insulation includes a first layer of insulation disposed between the plurality of outer panels and the plurality of thermal insulation blocks.

4. A system as in claim 2, wherein the insulation includes a second layer of insulation disposed between the plurality of thermal insulation blocks and the plurality of metal purlins.

5. A system as in claim 4, wherein the second insulation layer is supported by support rails which are configured to span the voids between the metal purlins and to be secured to the metal purlins.

6. A system as in claim 1, wherein the voids between the metal purlins are substantially open.

7. A system as in claim 1, wherein the first and second cleats comprise a u-shape.

8. A system as in claim 1, wherein the system includes an adhesive layer which is configured to be disposed between the thermal insulation block and at least one of the cleats.

9. A system as in claim 1, wherein the first and second cleats comprise u-shaped channels.

10. A system as in claim 1, wherein the outer panels are metal outer panels.

11. A system as in claim 1, wherein the protrusions on the first and second cleats penetrate the thermal insulation block.

12. A method of installing an insulated wall, comprising:
arranging a plurality of metal purlins in a substantially parallel configuration such that voids exist between the metal purlins;
disposing a plurality of cleats about opposite sides of a plurality of thermal insulation blocks to sandwich the thermal insulation blocks, each of said cleats being configured to cap a side of at least one thermal insulation block and having a protrusion which secures the thermal insulation block and inhibits lateral movement between the thermal insulation block and the cleat;
disposing cleats on one side of the thermal insulation blocks adjacent the plurality of metal purlins;
disposing an outer panel adjacent to the cleats on the opposite side of the thermal insulation blocks; and securing the outer panel, the cleats, and the thermal insulation block to the metal purlin with a fastener.

13. A method as in claim 12, wherein the method further includes the step of disposing insulation in the voids between the metal purlins.

14. A method as in claim 13, wherein the method includes securing support rails to the metal purlins such that the support rails span the voids between to the metal purlins and support the insulation, wherein the insulation is also disposed between the outer panel and the metal purlin.

15. A method as in claim 12, wherein the method further includes the step of disposing insulation between the plurality of metal purlins and the plurality of thermal insulation blocks.

16. A method as in claim 12, wherein the fastener is a threaded fastener having a first threaded region and a second threaded region which are separated by an unthreaded region and wherein the thermal insulation block has a thickness and the unthreaded region of the threaded fastener has a length which corresponds to the thickness of the thermal insulation block such that the unthreaded region is substantially disposed in the thermal insulation block.

17. A method as in claim 12, wherein the plurality of metal purlins are oriented vertically such that a wall system is formed.

18. A system as in claim 1, wherein the first cleat, the second cleat, and the insulation block extend substantially the same length as the metal purlin.

\* \* \* \* \*